Nov. 22, 1966 T. BAEHNI 3,286,453
MAGNETOSTRICTIVE HOROLOGICAL DRIVE SYSTEMS
Filed Feb. 25, 1965 5 Sheets-Sheet 1
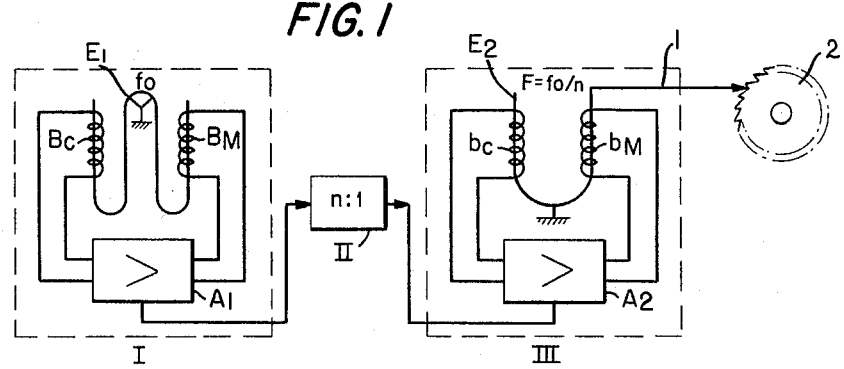
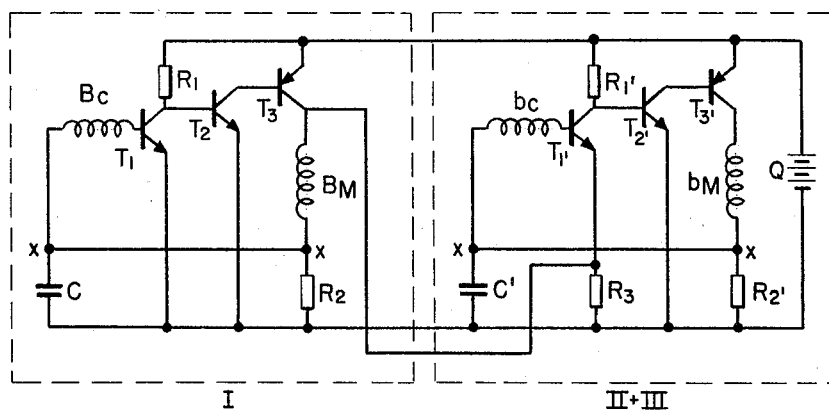
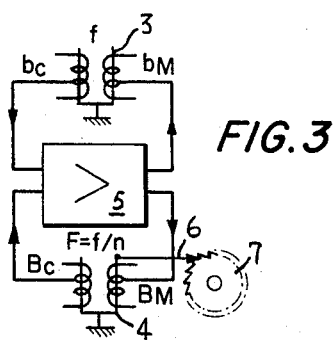
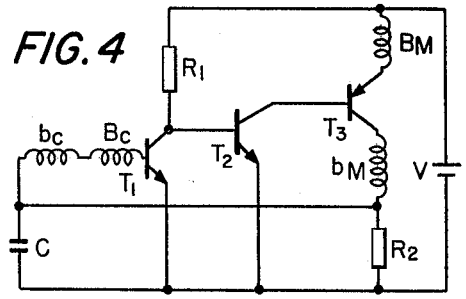
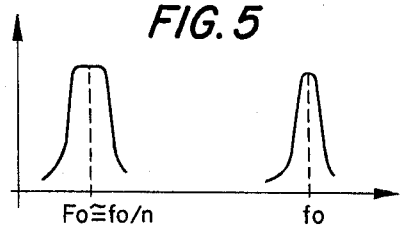

Nov. 22, 1966  T. BAEHNI  3,286,453
MAGNETOSTRICTIVE HOROLOGICAL DRIVE SYSTEMS
Filed Feb. 25, 1965  5 Sheets-Sheet 3
FIG. 13
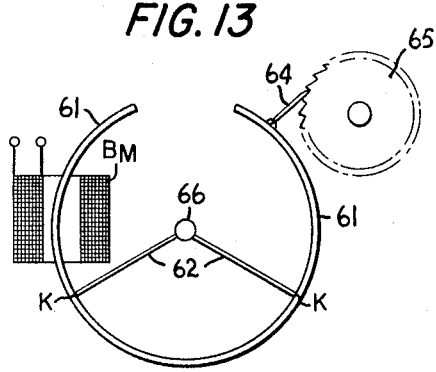
FIG. 14
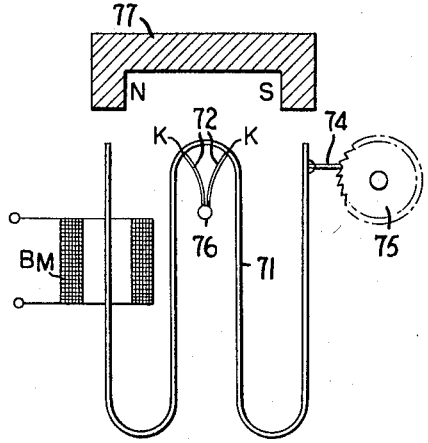
FIG. 15
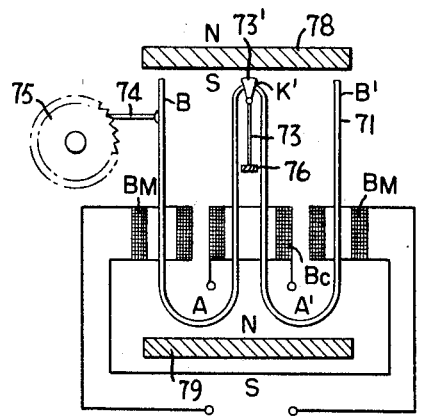
FIG. 16
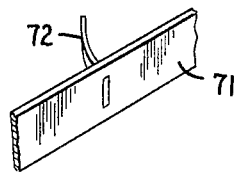
FIG. 17
FIG. 18
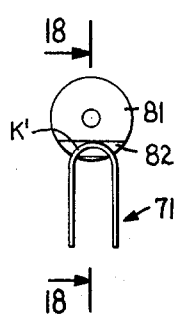
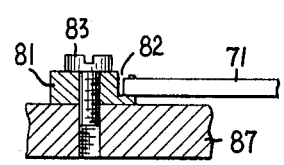
FIG. 19
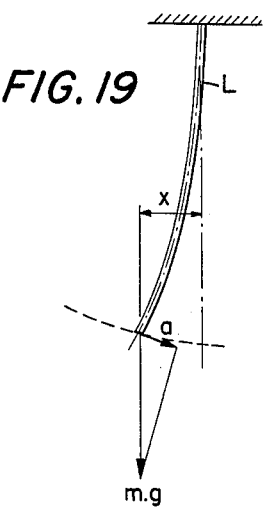

Nov. 22, 1966 T. BAEHNI 3,286,453
MAGNETOSTRICTIVE HOROLOGICAL DRIVE SYSTEMS
Filed Feb. 25, 1965 5 Sheets-Sheet 5

United States Patent Office 3,286,453
Patented Nov. 22, 1966

3,286,453
MAGNETOSTRICTIVE HOROLOGICAL DRIVE SYSTEMS
Thomas Baehni, Bienne, Switzerland, assignor to Baehni & Cie, Bienne, Switzerland, a corporation of Switzerland
Filed Feb. 25, 1965, Ser. No. 435,279
Claims priority, application Switzerland, Apr. 6, 1960, 3,877/60
7 Claims. (Cl. 58—23)

The present invention relates to watches, clocks and other time pieces and particularly to time pieces which are electrically operated. This application is a continuation-in-part of my application, Serial No. 100,630 filed April 4, 1961, now abandoned.

In electrical time pieces, it is necessary to convert electrical energy into mechanical movement. Moreover, it is necessary to provide an accurate time base for controlling the operation of the time piece. In accordance with the present invention, one or both of these functions is performed by an electromechanical oscillator comprising a flexible laminated magnetostrictive element having at least one lamina of magnetostrictive material and having the characteristic of flexing when subjected to a magnetic field and a winding associated with the magnetostrictive element and producing when energized a magnetic field acting on the magnetostrictive element to flex it. A preferred embodiment of the invention employs two such electromechanical oscillators, one acting as a time base and the other as a "motor" driving the time piece mechanism. While the two oscillators are similar in the general principle of their operation, they preferably have quite different operating characteristics. The oscillator for driving the time piece works must be capable of developing sufficient movement and power to operate the time piece. Its frequency stability does not need to be particularly precise since its frequency is controlled by an accurate time base. Hence, factors such as change of temperature, changes of load, change of position, etc., which might otherwise have an adverse effect on the frequency stability of the oscillator, do not disturb it by reason of the time base control. The only conditions which the laminated magnetostrictive element of the driving oscillator must meet, are providing as large as possible deflection under the influence of the periodic magnetic field in order to achieve the required driving movement for the time piece and a temperature independency with respect to deflection in the rest position within certain limitations. However, it is not necessary to provide compensation for the influence of temperature on the modulus of elasticity of the element and hence there is no need to use a particularly high quality material for the element or to provide for extremely exact mounting and adjustment of the element. Furthermore, considerable freedom is provided in selecting the physical form of the element and the location of the driving winding and the mechanical connections between the magnetostrictive element and the time piece works. If, for example, a U-form or a double U-form magnetostrictive element is used, the suspension of the element can be at the oscillation nodal points and the take off for mechanical energy can be either from one of the legs of the U or from a curved portion connecting the legs of the U.

A further advantage of the invention is that the driving oscillator is not limited to any minimum operation frequency and can, for example, operate at only a relatively low frequency in order to effect a direct drive of the time piece gear mechanism. The time base, on the other hand, preferably operates at a higher frequency in order to provide greater accuracy of frequency control, and electrical connections between the time base and the driving oscillator include a frequency divider or other appropriate means for achieving a frequency reduction.

The deformation provided by magnetostrictive material such as nickel, iron, nickel alloys or ferrites under the influence of a magnetic field are generally very weak and are insufficient for developing or maintaining a mechanical oscillation of sufficient amplitude to be used directly for the drive or operation of a time piece. In accordance with the invention, magnetostrictive bimetallic strips are used in such a way as to possess magnetostrictive characteristics providing considerably stronger mechanical deflections which are of sufficient amplitude and strength to provide the motive power for directly operating a time piece. Moreover, the driving oscillator preferably includes a feedback coil and an amplifier through which periodic signals generated in the feedback coil by oscillation of the magnetostrictive element are amplified and fed back to the driving winding so as to provide a regenerative effect.

The time base oscillator similarly comprises a laminated magnetostrictive element, driving coil and feedback coil or transducer connected to the driving coil by an amplifier. However, the requirements for the oscillator used as a time base are quite different from those of the driving oscillator. The time base must oscillate at a constant frequency in order to provide accurate time keeping qualities of the time piece. The time base oscillator does not need to develop mechanical power since there are no mechanical connections between it and the time piece works. On the other hand, it is important in watches and other portable time pieces for the natural frequency of the oscillator to be as independent as possible of the effects of the earth gravitational field acting on the oscillator when the time piece is in different positions. By reason of the shape of the laminated magnetostrictive element of the oscillator in accordance with a preferred embodiment of the invention, the influence of the force of gravity on the oscillator is substantially eliminated. Since there is no mechanical driving connection between the time base oscillator and the works of the time piece, the frequency of the time base is not disturbed by changes in load or other factors which might affect an oscillator if directly connected to the time piece works. When the oscillators are to be used in small watches and other small time pieces, it is necessary for the dimensions of the oscillators to be kept as small as possible. In accordance with the present invention, this is accomplished by the configuration and construction of the oscillators.

While it is preferable to use magnetostrictive oscillators, both as a time base and as a driving oscillator, the advantages of the invention can in part be achieved by using a magnetostrictive electromechanical oscillator as the driving "motor" of the time piece and controlling it by a crystal oscillator or other suitable time base or by using a magnetostrictive electromechanical oscillator as a time base and using a synchronous motor or other means for driving the time piece works. Moreover, the improved electromechanical oscillators in accordance with the present invention may if desired be used for other purposes.

The objects and advantages of the invention will be more fully understood from the following description and claims in conjunction with the accompanying drawings in which:

FIG. 1 is a schematic diagram of a time piece in accordance with the invention comprising a time base oscillator, a driving oscillator and time piece works.

FIG. 2 is a more detailed circuit diagram of the time base oscillator and driving oscillator shown in FIG. 1.

FIG. 3 is a schematic diagram similar to FIG. 1, but illustrating the use of a single amplifier for both the time base oscillator and driving oscillator.

FIG. 4 is a more detailed circuit diagram of the amplifier of FIG. 3.

FIG. 5 shows resonance curves of the driving oscillator and time base oscillator.

FIG. 13 is an oscillator in which the magnetostrictive element is in the form of a circular arc.

FIGS. 14 and 15 are schematic views of oscillators in which the magnetostrictive elements are in the form of a double U and are magnetically biased.

FIGS. 16, 17 and 18 show details of mounting of the magnetostrictive element, FIG. 18 being a section on the line 18—18 of FIG. 17.

FIG. 19 is a schematic view illustrating the effect of gravity on the magnetostrictive element of an oscillator.

FIGS. 1 and 2 illustrate a time piece comprising a time base oscillator I connected through a frequency divider II to a driving oscillator III for driving the first gear of a time piece works.

Figure 6:
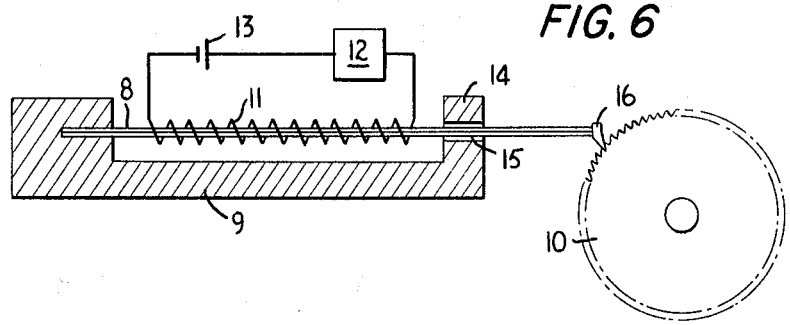
FIG. 6 is a schematic view of a first embodiment of a magnetostrictive oscillator shown as being used as the driving oscillator of a time piece.

The time base oscillator I comprises a magnetostrictive element E1 which is shown in the form of a double U supported at nodal points of oscillation. The magnetostrictive element E1 is a flexible laminated strip consisting of laminae with different magnetostrictive coefficients. For example, one lamina is manufactured from an alloy known commercially as High Ni-Alloy (94.48% Ni; 5% Co; 0.75% Mn and 0.27% Si) and the other from a nickel-iron alloy which contains 38% Ni, 5% Cr, 0.01% C, and the balance iron. One leg of the magnetostrictive element E1 is surrounded by a driving coil BM while another leg is surrounded by a feedback coil Bc. The feedback coil acts as a transducer to generate an electric signal and is connected back to the driving coil through an amplifier A1.

The driving oscillator III comprises a laminated magnetostrictive element E2 shaped in the from of a U and supported by the curved portion joining the two legs of the U. A driving coil $b$M surrounds one leg of the U-shaped element E2 while a feedback coil Bc surrounds the other leg. As in the time base oscillator I, the feedback coil Bc acts as a transducer so that a signal is generated in the coil by the oscillation of element E2. This signal is amplified by amplifier A2 and fed back to the driving coil $b$M.

The driving oscillator III is electrically connected to the time base oscillator I so that the frequency of the driving oscillator is controlled by the time base. As it is desirable in some applications for the driving oscillator to operate at a lower frequency while the time base oscillator should operate at a higher frequency for greater accuracy, the connection between the two oscillators may provide for frequency reduction. As illustrated in FIG. 1, the output of amplifier A1 of time base oscillator I, is connected to the input of the amplifier A2 of the driving oscillator III through a frequency divider II. Thus, if the time base oscillator 1 oscillates at a constant frequency of $fo$, the driving oscillator will oscillate at a frequency F which is equal to $fo/n$, where $n$ is the reduction factor of the frequency divider II. The frequency $fo$ of the time base is preferably of the order of 300 to 450 hertz units and the reduction factor $n$ may be 1, 2 or 3. The natural frequency $Fo$ of the magnetostrictive element E2 of the driving oscillator, should be near the operating frequency F. However, the exact frequency at which it operates is controlled by the time base oscillator. Preferably, as illustrated in FIG. 5, the magnetostrictive element E2 of the driving oscillator is designed in such manner that its resonance curve is somewhat widened with an upper plateau while the fundamental or natural frequency $fo$ of the time base oscillator has a resonance curve with a relatively sharp peak.

The magnetostrictive element E2 of the driving oscillator III is mechanically connected to the gear train of the time piece so that the driving oscillator constitutes in effect a "motor" which provides power for driving the time piece works. In FIG. 1, this driving connection is illustrated schematically as a pawl 1 which is carried by one of the legs of the magnetostrictive element E2 and engages a ratchet wheel 2 which constitutes the first gear of the time piece works.

FIG. 2 illustrates by way of example the circuitry of the time base and driving oscillators of a system such as that shown in FIG. 1. The time base oscillator I and the driving oscillator III—which also incorporates the function of the frequency reducer II—are of similar design. Both amplifiers are fed by common battery Q and each provides three-stage amplification. Thus, the time base oscillator comprises two npn transistors T1 and T2 and a pnp transistor T3. The driving oscillator similarly comprises two npn transistors T1' and T2' and a pnp transistor T3'. The feedback coils Bc and $bc$ are connected in the base circuits of transistors T1 and T1' respectively while the driving coils BM and $b$M are connected respectively in the collector circuits of transistors T3 and T3'. The connection designated $x$—$x$ represents the feedback coupling of the oscillators for the direct current component of the current whereas the alternating current component is uncoupled by condensers C and C' respectively. Resistances R1, R2, R1', R2' and R3 serve to provide the required potential and the required amperage.

The base-emitter voltage for transistors T1 and T1' is selected, for example, as 0.45 volt and the emitter-collector voltage of transistors T3 and T3' is selected for example as a minimum of 0.2 volt so that the required minimum supply voltage would be approximately 0.65 volt. The total current consumption is thus determined by the values of the resistances used. The three-stage amplifiers illustrated in FIG. 2 have the advantage that their output, as a function of the feeding voltage, is considerably more constant than would be obtained with single stage amplifier since the base-emitter voltage of transistors T1 and T1' changes only very slightly as a function of the supply voltage of the battery Q. Moreover, if the ambient temperature increases, the base-emitter voltage of the first transistor and the required current decrease. This effect is desirable since it stabilizes the temperature-amplification characteristics of the transistors and permits the use of these amplifiers throughout a very large temperature range without additional expenditure for temperature compensation.

The system illustrated in FIGS. 1 and 2 consisting of separate resonators for the time base and the driving oscillator has the advantage that the frequency stability of the time base is not influenced by the mechanical load or stress of the driving organ. The electric reaction of the driving oscillator on the time base is inconsequential. Hence, the time base is able to maintain an exceptionally stable frequency.

FIG. 3 and 4 illustrate a further arrangement in accordance with which the time base and driving oscillator comprise separate resonators as in FIGS. 1 and 2, but a common amplifier is utilized for both oscillators. Thus, as seen in FIG. 3, the time base oscillator comprises a laminated U-shaped magnetostrictive element 3 with a driving coil bM and a feedback coil bc while the driving oscillator comprises a laminated U-shaped magnetostrictive element 4 having a driving coil BM and a feedback coil Bc, with a common amplifier 5. Mechanical connections between the magnetostrictive element 4 of the driving oscillator and the time piece works is illustrated as comprising a pawl 6 engaging a ratchet wheel 7 representing the first wheel of the time piece.

The common oscillator 5 (FIG. 4) is a three-stage amplifier corresponding in design to one of the amplifiers illustrated in FIG. 2. The driving coils BM and bM are connected respectively in the exciter and collector circuits of the third stage transistor T3 while the feedback coils Bc and bc are connected in series in the base circuit of the first transistor T1. The use of a common amplifier for the two transistors contributes to providing a very compact and small time piece.

In FIG. 6, there is illustrated a time piece in which a magnetostrictive element comprising a laminated spring strip 8 is clamped with one end in a stationary base or socket 9 which is mounted inside a watch or other time piece, the works of which are represented by a ratchet wheel 10. At least one of the strips forming the laminated element is composed of a magnetostrictive material. The magnetostrictive element 8 is surrounded by a coil 11 excited by periodical current impulses supplied by current source 13 under control of a time base 12. The time base 12 may be a suitable electromechanical or purely electrical oscillator or a frequency stabilized source of alternating current. Preferably, however, it is a magnetostrictive oscillator as illustrated in FIGS. 1 and 3.

The base 9 extends approximately parallel to the magnetostrictive element 8 and is provided with an upwardly projecting portion 14 having an opening 15 through which the magnetostrictive element extends. The opening is of such dimensions as to avoid interference with flexing of the strip under the influence of the periodic magnetic field supplied by the coil 11. The base 9 consists of ferromagnetic material and is formed so as to surround the coil 11 on three sides so as to provide a magnetic shield and also increase the effectiveness of the magnetic field produced by coil 11.

The free end of the magnetostrictive element 8 carries a pawl 16 which engages the teeth of the ratchet wheel 10 so that the periodic deformation of the magnetostrictive element 8 transmits step-by-step rotary movement to the ratchet wheel and hence to the gear train of the time piece of which the ratchet wheel constitutes the first gear. The pawl 16 is preferably mounted on the element 8 so as to be swingable through a small angle.

The frequency of the current impulses by which the driving coil 8 is energized and therefore the frequency of the magnetic field around the magnetostrictive element 8 is selected according to the natural frequency of oscillation of the element 8 or an integral multiple or sub-multiple of this frequency. It is also possible, as is explained above in connection with FIGS. 1 and 2, to effect a suitable frequency reduction between the time base and the driving coil. In this way, it is possible to operate the time base at a sufficiently high frequency to achieve good frequency stability whereas the mechanical frequency of the magnetostrictive element 8 is sufficiently low—for example, between 100 and 250 hertz units, so that the number of teeth on the first gear wheel 10 of the time piece works will not be too high, for example, between 50 and 200. The laminated strip 8 is preferably made of iron-nickel or nickel-cobalt alloys, for example, of the composition indicated above. By selecting different coefficients of magnetostriction for the two laminae, it is possible to achieve a greater or less deflection under the influence of the magnetic field. Greater amplitude of deflection is obtained if the coefficient of magnetostriction of one strip is positive and that of the other strip is negative.

The length of the laminated strip 8 may be, for example, of the order of 15 to 20 mm. its thickness of the order of 0.4 to 0.5 mm. and the deflection of the order of 0.05 to 0.3 mm. This applies also to strips which are U-shaped or double U-shaped as illustrated in FIGS. 1 and 3 and described more fully below.

In order to avoid or reduce a temperature effect, it is desirable to select two strips with similar thermoelastic coefficients so that a deflection of the laminated element 8 in its rest position as a function of the temperature will be practically prevented.

Figure 7:
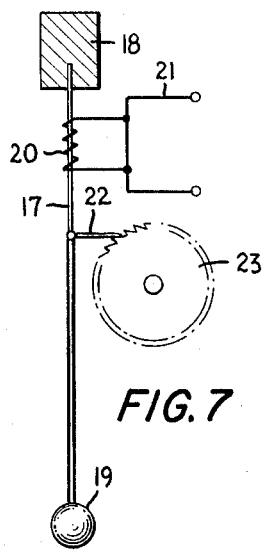
FIG. 7 is a schematic view of a further oscillator including a pendulum.

In FIG. 7, a straight laminated magnetostrictive element 17 has one end secured in a base 18 while the other end is connected to a pendulum 19. The magnetostrictive element 17 is surrounded by a driving coil 20 which is periodically excited by an independent time base 21. The oscillations of the magnetostrictive element 17 under excitation by the coil 20 effect movement of the pendulum by which the time piece gear train is driven. It should be noted in this connection that the driving weight or spring which are usually associated with a pendulum and escapement wheel are eliminated, since the magnetostrictive element in conjunction with the pendulum constitute the driving "motor" of the time piece. The drive is indicated schematically as comprising a pawl 22 carried by the strip 17 and engaging a ratchet wheel 23 which constitutes the first wheel of the time piece works.

Figure 8:
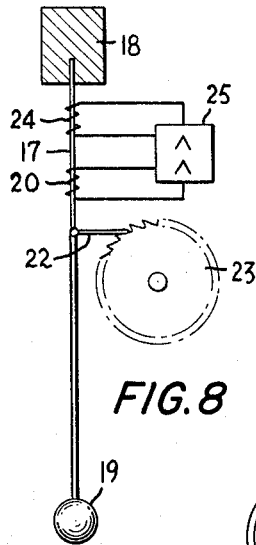
FIG. 8 is a schematic view of another embodiment of an oscillator including a pendulum and a feedback coil.

In FIG. 8, there is shown a similar oscillator in which corresponding parts are designated by the same reference numerals. However, in addition to the driving coil 20, there is a feedback coil 24 which also surrounds the magnetostrictive element 17 and is connected to the driving coil 20 through an amplifier 25. There is thus provided a regenerative feedback for increasing the oscillation of the magnetostrictive element and pendulum.

Figure 9:
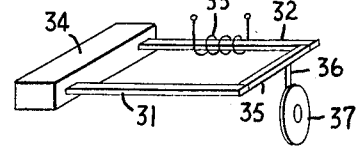
FIG. 9 is a schematic perspective view of an oscillator employing two magnetostrictive elements.

In the embodiment of FIG. 9, the driving oscillator comprises two laminated magnetostrictive strips 31 and 32 at least one of which is surrounded by a driving coil 33. One end of each of the strips is clamped in a socket 34 while the opposite ends are connected with one another by a yoke 35 of ferro-magnetic material. The driving coil 33 is periodically excited by a time base (not shown). The socket 34, which is also of ferro-magnetic material, the two laminated strips 31 and 32 and the yoke 35 constitute a closed magnetic path so that the coil 33 is highly effective. A pawl 36 carried by the yoke 35 engages a ratchet wheel 37 which constitutes the first wheel of a time piece works. Oscillation of the two laminated strips 31 and 32 and connecting yoke 35 through the periodic excitation of the driving coil 33 thus imparts rotary movement to the ratchet wheel 37 to drive the time piece.

Figure 10:
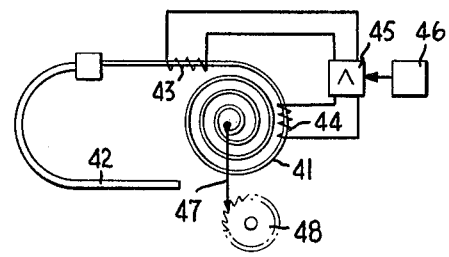
FIG. 10 is a schematic view of a magnetostrictive oscillator having a magnetostrictive element of spiral form.

In the embodiment of FIG. 10, the laminated magnetostrictive element is in the form of a spiral 41, one end of which is securely held by a yoke 42 which is of ferro-magnetic material and is curved back toward the spiral so as to provide a good magnetic path. The strip 41 is embraced by a driving coil 43 and also by a feedback coil 44 which is connected to the driving coil through an amplifier 45. The oscillator is synchronized through an independent time base 46. By controlling the magnetostrictive element 41, not only by the driving coil 43, but also by the feedback coil 44 so as to provide a closed oscillator circuit, the frequency stability of the oscillator is increased and the oscillation is amplified and strengthened. It will be noted that the magnetostrictive element 41 is a part of the driving oscillator and does not constitute a part of the time base 46, so that the frequency stability of the latter is not disturbed by mechanical load or stress on the driving element 41. A driving pawl 47 engages a ratchet wheel 48 which constitutes the first wheel of the time piece mechanism. Through periodic energization of the driving coil 43, the spiral laminated strip 41 is subjected to a periodical compression and expansion in such manner that the inner end of the spiral performs a small periodical rotary motion which is transmitted by the pawl 47 to the ratchet wheel 48.

Figure 11:
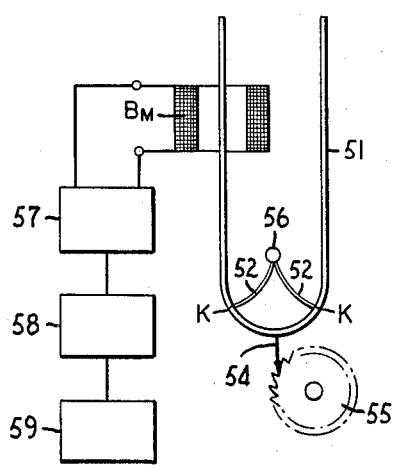
FIGS. 11 and 12 are schematic views of oscillators in which the magnetostrictive element is of U-shape.

In the embodiment shown in FIG. 11, the laminated magnetostrictive element 51 is in the form of a letter U and is suspended at its nodal points K by means of leaf springs 52 carried by a support 56, which is provided for example on the base or in the case of a time piece. The supporting springs 52 extends laterally from the magnetostrictive element and hence permit movement of the element in the direction of its length. At the nodal points where the supporting springs 52 are attached, there is substantially no lateral movement of the magnetostrictive strips 51. Hence, the oscillations of the magnetostrictive element are not transmitted to the base or case of the time piece. A driving pawl 54 attached to the magnetostrictive element at approximately the center of the curved portion joining opposite legs of the U-shaped strip engages a ratchet wheel 55 constituting the first wheel of the time piece works. At the point of attachment of the pawl 54, the strip 51 oscillates in a direction approximately parallel with the leg portions of the strip. Oscillation of the magnetostrictive element 51 is produced by a driving coil BM which is periodically excited by an amplifier 57 which is connected through a frequency divider 58 through a time base oscillator 59. The time base 59 is, for example, operated at a frequency of 300 hertz units whereas the magnetostrictive element 51 oscillates with a frequency of 100 hertz.

Figure 12:
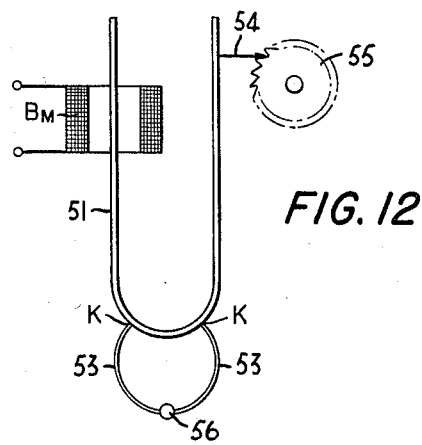

A similar embodiment is illustrated in FIG. 12. The U-shaped magnetostrictive element 51 is supported at nodal points K by leaf springs 53 mounted on a support 56 which is disposed outside of the U. The driving coil BM surrounds one leg portion of the U-shaped strip while the driving pawl 54 is carried by the opposite leg. The driving coil BM is periodically energized at a selected frequency as in the embodiment of FIG. 11.

In the embodiment of FIG. 13, the laminated magnetostrictive element 61 is arcuate, constituting the major portion of a circle. It is supported at nodal points K by leaf springs 62 carried by a support 66. A driving winding BM surrounds one portion of the strip removed from the nodal points while a pawl 64 pivotally carried by another portion of the arcuate strip 61 engages and drives a ratchet wheel 65 constituting the first wheel of a time piece works. As in the previously described embodiments, the magnetostrictive element 61 is caused to oscillate at approximately its natural frequency by periodic excitation of the driving coil BM under control of an accurate time base. The driving pawl 64 may be attached to another portion of the element 61 having oscillatory movement, for example, the curved portion between nodal points K.

In the embodiment illustrated in FIG. 14, the magnetostrictive laminated strip 71 is in the form of a double U suspended at its nodal points K by means of leaf springs 72 carried by a support 76. The nodal points lie on the curved portion connecting the inner legs of the two U-shaped portions. A driving coil BM surrounds one of the outer legs while the other outer leg carries a driving pawl 74 engaging a ratchet wheel 75 representing the time piece works. The driving coil BM is periodically energized by electric current under control of an accurate time base as in the embodiment of FIG. 11.

In order to achieve maximum deflection of the magnetostrictive element under the influence of the periodical field supplied by the driving winding BM, the element 71 is premagnetized by a permanent magnet 77. One pole of the magnet lies opposite one free end of the strip and the other pole of the magnet lies opposite the other free end of the strip. In this manner, the bimetallic strip receives a uniform magnetic bias, one free end forming the south magnetic pole and the other free end forming the north magnetic pole. By virtue of this premagnetization, the working point on the magnetization-deformation characteristic curve of the magnetostrictive element is located on a steep portion of the curve so that a relatively small change in the magnetic field produced by the driving coil BM will cause a relatively large deflection.

FIG. 15 illustrates a modification in which the bend or curvature of the center arc is sufficiently small that the two nodal points practically coincide in a common nodal section K'. In this nodal section, the laminated strip is suspended on a support 76 by means of a single leaf spring 73 and attaching element 73'. Each of the two outside legs of the double U-shaped strip is surrounded by a driving coil BM while a feedback coil BC surrounds the two inner legs. The feedback coil constitutes a transducer which is connected back to the driving coils through an amplifier, as illustrated for example in FIG. 1. Moreover, the frequency of the driving oscillator illustrated in FIG. 15 is controlled by a time base as in the embodiments previously described.

The magnetostrictive element 71 in FIG. 15 is premagnetized by a uniform magnetic field which is oriented parallel to the straight leg portions of the double U-shaped strips. This field is provided by two magnets 78 and 79, which may be ceramic magnets, having north and south poles as illustrated. By reason of this different premagnetization, the magnetostrictive strip has a form of oscillation which is different from that of the oscillator illustrated in FIG. 14 and which will be described in greater detail below.

FIG. 16 is a fragmentary perspective view illustrating by way of example, one mode of attaching a supporting spring to the magnetostrictive element. The spring 72 is shown as having a reduced end portion which is pressed into an opening in the magnetostrictive strip 71 and suitably secured, for example by welding or by having the end of the strip peened over like a rivet. FIGS. 17 and 18 illustrate by way of example a fastening device for holding the magnetostrictive element by a single curved portion of small radius as in FIG. 15. The fastening element is shown as comprising a small cylindrical member 81 provided with a chordal slot 82 in which the center bow of the magnetostrictive element is clamped at nodal point K' and is secured in suitable manner. The element 81 is suitably secured on the clockwork plate 84, for example by means of a screw 83.

Particularly in the case of a magnetostrictive oscillator used as a time base in a watch or other portable time piece the position of which may be changed with respect to gravity, it is desirable to avoid the effect of gravity on the frequency stability of the oscillator. FIG. 19 illustrates schematically the effect which is exerted on a resonator by the force of gravity. A laminated magnetostrictive strip L which is clamped at its upper end and is vertical in its rest position, undergoes a deflection X in one direction through the application of magnetic force and also is subjected to the force of gravity $mg$ having a component $a$ in the direction of the oscillation. The gravity component $a$ is superimposed on the elastic restoring force of the spring strip. The magnitude of the component $a$ is, in the case of small deflections, practically proportional to the amount of deflection X. This component thus has the character of an elastic force which is added to the elastic restoring force of the spring. However, if the arrangement according to FIG. 19, is now turned 180°, it will be seen that the gravity component $a$ opposes the restoring force of the spring and hence must be subtracted. As the restoring force of the spring is a primary factor in determining the frequency of oscillation of the strip, it will be seen that the frequency will vary, depending upon the position of the resonator with respect to gravity.

In accordance with the present invention, a magnetostrictive lamianted spring strip in the form of a double U is preferably used as the resonator in order to avoid the above-mentioned interfering effect of gravity. Moreover, two different ways of suitable premagnetization of the magnetostrictive element provide two different modes of oscillation of the double U-shaped element and cooperate in rendering interfering effects caused by gravity ineffective in whatever position the resonator is placed. Suitable premagnetization of the magnetostrictive element also transfers or shifts the "working point" of the element to a position on the magnetization-deformation curve into a range where small changes of a magnetic field produce large deflections. This will be explained with reference to the curve shown in FIG. 20 and the time base oscillator illustrated schematically in FIG. 21.

Figure 21:
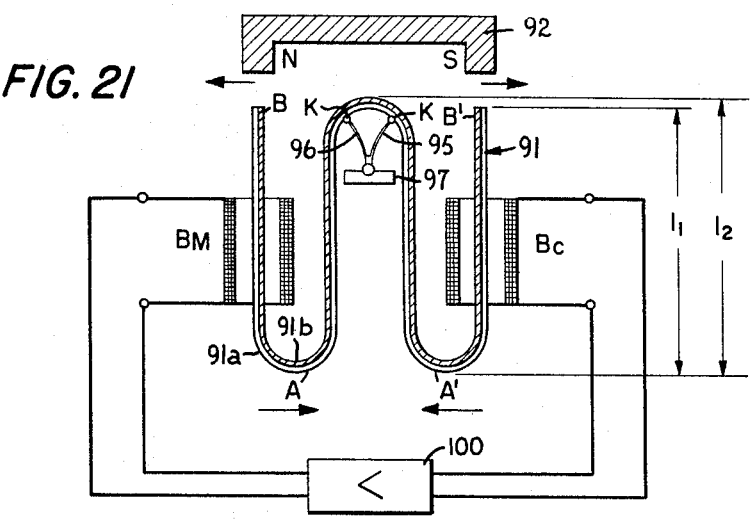
FIG. 21 is a schematic view of an oscillator in which the magnetostrictive element is in the form of a double U and is magnetically biased.

The time base oscillator of FIG. 21 comprises a magnetostrictive element 91 in the form of a double U-shaped laminated spring strip consisting of two laminae 91a and 91b which are secured to one another at their mating surfaces. The element 91 is suspended at its nodal points K by means of leaf springs 95 and 96 each of which has one end secured to the element 91, for example as illustrated in FIG. 16 and the other end rigidly clamped in a stationary support 97. By suspending the element 91 at its nodal points, the loss of oscillation energy due to transmission of such energy to the support 97, and the resulting damping action of such loss is reduced to a minimum. As described above, the laminae 91a and 91b have different magnetostrictive coefficients so that the magnetostrictive element 91 is caused to flex when subjected to a magnetic field. Hence, by periodically energizing the element at a suitable frequency, oscillation of the element about its nodal points is produced. To produce periodic magnetization of the magnetostrictive element 91, one leg of the U-shaped strip is surrounded by a driving winding BM while a control coil Bc surrounds either the same leg or another leg of the strip. The control coil Bc acts as a transducer so that oscillation of the strip generates periodic electric signals which are amplified by an amplifier 100 and fed back to the driving coil BM.

If the driving coil BM is excited by a current impulse, one of the laminae, for example, lamina 91b elongates due to its magnetostrictive characteristics. This elongation causes the curved portion A of the left U to be deflected toward the right as indicated by the arrow, while the left free end B of element 91 will be flexed toward the left. The other free end B' accordingly is deflected toward the right end the curved portion A' of the right U is deflected toward the left so that the two portions A and A' approach one another while the two end portions B and B' will move away from one another. All four of these portions move in arcuate paths in the manner illustrated in FIG. 19 and are hence, subject to gravitational force. However, it will be seen that the gravitational component in line with the direction of deflection is additive to the elastic restoring force of the spring strip with reference to portions A and A', but is subtractive with respect to portions B and B'. If the lengths $l_1$ and $l_2$ (FIG. 21) are approximately the same, the two gravitational components are of the same magnitude but opposite in direction. The interference effect caused by the force of gravity therefore disappears and it will be apparent that this applies to all positions of the oscillator.

Moreover, the magnetostrictive element 91 is preferably premagnetized, for example by a permanent magnet 92 having a north pole opposite the free end B and a south pole opposite the other free end B' of the magnetostrictive element 91. The magnetization-deformation characteristic of the element 91 is illustrated by the curve G in FIG. 20 in which deflection F is plotted against magnetization H. If there were no premagnetization, then a magnetic field produced by the driving winding BM and having a strength $+dH$ would produce only a very small deflection. However, by providing a stationary magnetic field $+Ho$, the working point P is shifted to the steep section of the characteristic curve so that a change of magnetic field $+dH$ by the driving coil, will produce a large deflection $dF$. In the embodiment of FIG. 21, the magnetostrictive element has substantially the same working point P throughout due to its uniform premagnetization.

Figure 20:
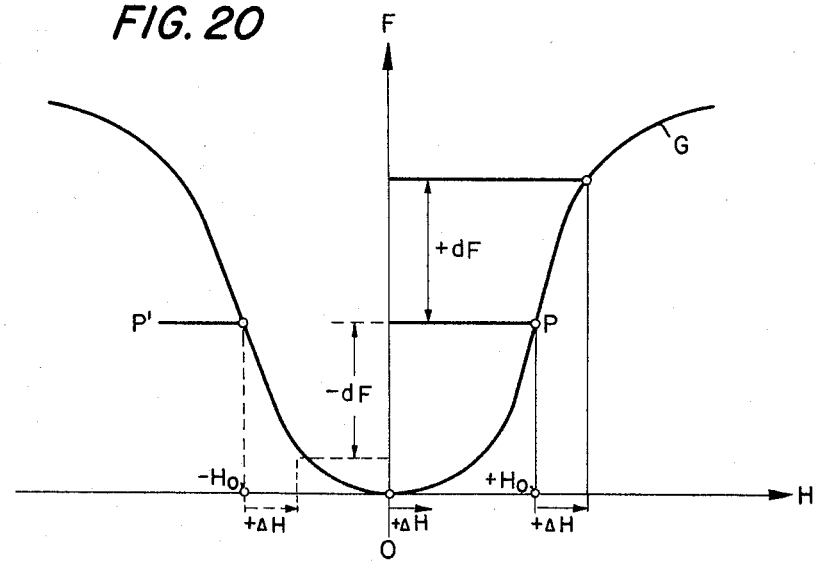
FIG. 20 is a curve illustrating how gravitional effects are compensated in accordance with the invention and the effects of premagnetization.

The oscillator illustrated in FIG. 15 and described above, is also premagnetized, but has different characteristics due to the fact that it is premagnetized in a different way. In this case, the two magnets 78 and 79 produce a magnetic field which is at least approximately uniform and is in line with the plane of the double U-shaped magnetostrictive element 71. By virtue of this magnetic field, a non-uniform magnetization within the double U-shaped magnetostrictive element is produced so that the free ends B and B' have like polarity and the direction of magnetization of the strip changes at points A, K' and A'. With reference to FIG. 20, the working points P of the section B–A and K'–A' are hence located at $+Ho$ while the working points P' of sections A–K' and A'–B are located at $-Ho$. The magnetic field produced by the driving coil BM is however, unidirectional along the entire element and causes a field increase $dH$ in all sections of the element at the same time. However, this increase of the magnetic field causes an elongation $+dF$ for sections B–A and K'–A' at working point P and a contraction $-dF$ for sections A–K' and A'–B' at working point P'. Consequently, the free end B and also the curved portion A have an at least approximately rectilinear displacement to the left when the coil is excited while the other free end B' as well as the other curved portion A' will have a substantially rectilinear deflection toward the right. If the legs of both U-shaped portions are approximately equal, then the points A and B and the points A' and B' move on approximately straight lines which are approximately perpendicular to the direction of the magnetization field. Also, in this case, the interference components due to the force of gravity substantially cancel one another so that the oscillator is independent of position. Moreover, by reason of operating on a steep portion of the magnetization-deformation characteristic curve of the magnetostrictive element, there is obtained a strong oscillation which is substantially independent of gravity.

Figure 22:
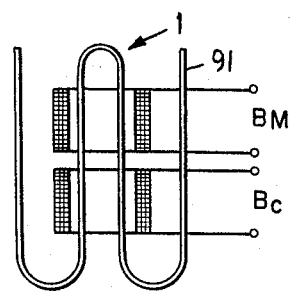
FIG. 22 is a schematic view illustrating a different arrangement of driving and feedback coils on a magnetostrictive element in the form of a double U.

FIG. 22 illustrates a modification of the oscillator shown in FIG. 21 in that both the driving coil BM and the control coil Bc surround the two middle legs of the double U-shaped laminated magnetostrictive element 91.

Figure 23:
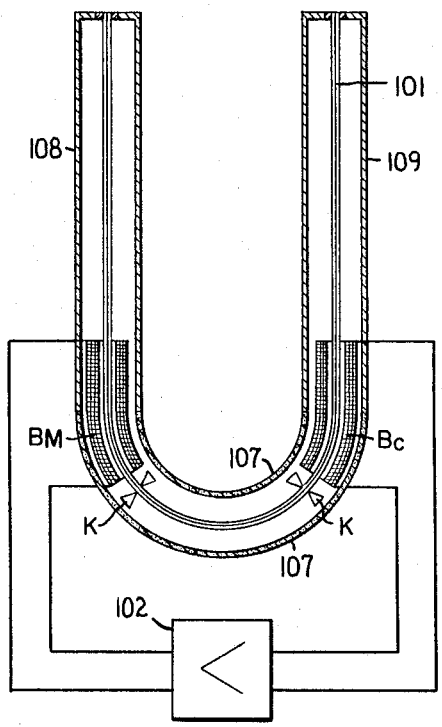
FIG. 23 is a schematic view illustrating a U-shaped magnetostrictive element which is magnetically biased and temperature compensated.

While a single U-shaped magnetostrictive element does not have all of the advantages of the double U-shaped elements shown for example in FIGS. 21 and 22, it nevertheless, has good operating characteristics and provides a small and compact installation, particularly suitable for small time pieces such as wrist watches. In the oscillator shown in FIG. 23, a U-shaped laminated magnetostrictive element 101 is supported at its nodal points K. A control coil Bc on one leg of the U is connected through an amplifier 102 to a driving coil BM on the other leg. The magnetostrictive element 101 is premagnetized by a permanent magnet 107 in the shape of a tube which surrounds the central portion of the element 101. The two straight leg portions of the element 101 are surrounded by tubes 108 and 109 which form extensions of opposite ends of the tubular magnet 107 and are made of a material the permeability of which changes with temperature. For this purpose, can be used materials known under the trade names, "Thermoperm," "Thermoflux," "Thermoferrite," or "Alliage N.M.H.G." In this manner, it is possible to achieve magnetization as a function of ambient temperature changes in such a way that the temperature effect on the elastic characteristics of the resilient element 101 is at least approximately compensated by changes in the magnetic permeability of tubes 108 and 109 and hence in the premagnetization of the magnetostrictive elements. The tubular magnet 107 as well as tubes 108 and 109 also serve for the reduction of magnetic losses, in as much as they align and concentrate the magnetic lines of force in a direction longitudinal of the magnetostrictive elements. Moreover, the tubes 108 and 109 serve for magnetic shielding against extraneous magnetic fields, whereby the stability of the oscillator is still further increased. The principle of making the premagnetizing field of the magnetostrictive element responsive to temperature so as to compensate at least in part for temperature effects on the magnetostrictive element itself can, of course, be applied to oscillators using a double U-shaped magnetostrictive element.

Figure 24:
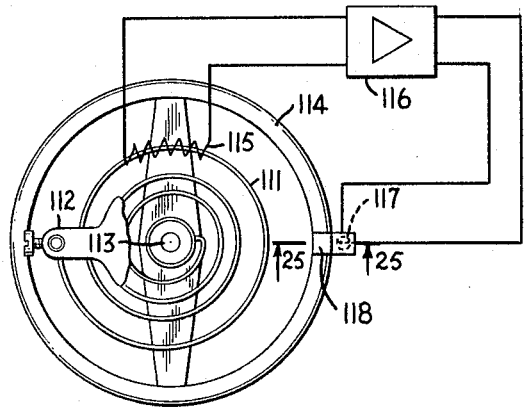
FIG. 24 is a schematic view of an oscillator having a spiral magnetostrictive element in combination with a balance wheel.
Figure 25:
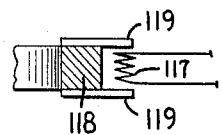
FIG. 25 is an enlarged cross section taken approximately on the line 25—25 in FIG. 24.

The oscillator illustrated in FIG. 24 comprises a laminated magnetostrictive element 111 in the form of a spiral spring, the outer end of which is adjustably held by a support arm 112 while the inner end is secured to a rotatably supported shaft 113 carrying a balance wheel 114. A portion of the spiral spring is surrounded by a driving coil 115 which is fed from an amplifier 116 by electrical impulses induced in a transducer in the form of a feedback coil 117. A permanent magnet 118 (FIG. 25) with pole pieces 119 are carried by the balance wheel 114 with portions of the pole pieces projecting beyond the circumference of the balance wheel in position to induce signals in the stationary feedback coil 117 whenever they pass the coil. Thus, oscillation of the spiral 111 and balance wheel 114 induces periodic signals in the feedback coil 117. These signals are amplified by the amplifier 116 and fed to the driving coil 114 so as to maintain the oscillation of the resonator. Instead of cooperating with a magnet on the balance wheel, the feedback coil 117 can, if desired, be placed around a portion of the spiral spring 111 as illustrated for example, in FIG. 10.

Figure 26:
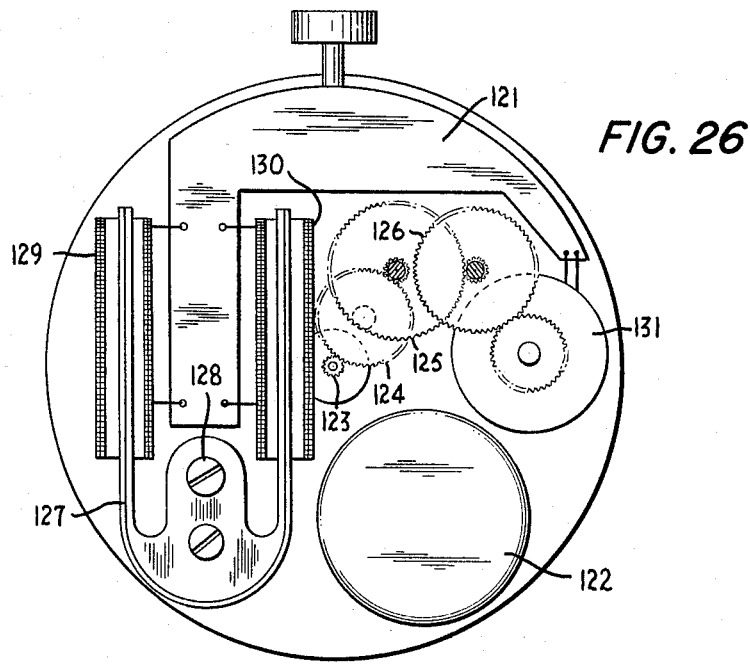
FIG. 26 is a schematic view of a time piece driven by a synchronous motor and having a magnetostrictive oscillator as a time base.

FIG. 26 illustrates schematically a watch which operates with a magnetostrictive time base oscillator according to the invention. The resonator of the time base is formed by a U-shaped laminated magnetostrictive element 127 mounted on the clockwork plate 128. The legs of the U-shaped elements are surrounded respectively by a driving coil 129 and a feedback coil 130. The coils are connected respectively to the output and input circuits of an amplifier 121 supplied with electrical energy from a battery 122. The periodic impulses of the time base oscillator drive a synchronous motor 131 which drives the time piece works consisting of gears 123, 124, 125 and 126. Instead of the synchronous motor 131, a driving oscillator as illustrated for example in FIG. 1, may of course, be used.

The magnetostrictive oscillators in accordance with the present invention can be designed with very small dimensions having a magnitude, for example, of the order of magnitude of a few millimeters. By controlling the frequency of a driving oscillator by means of a time base oscillator which is not mechanically loaded, an extremely high frequency stability of the driving system is achieved. Also, the time base itself is preferably a very small magnetostrictive oscillator so that the space requirements and energy requirements of the entire driving system including the time base are very small. The system is thus especially suitable for use in wristwatches and other small time pieces. Moreover, by suspending the magnetostrictive resonators at their nodal points of oscillation, the loss of energy is reduced to a minimum and the effectiveness of the device is increased.

It will be understood that the individual features of the several modifications herein described and illustrated are mutually interchangeable insofar as they are compatible and that configurations and arrangements illustrated in conjunction with time base oscillators are also applicable to driving oscillators and vice versa. Other modifications may be made without departing from the spirit of the invention as will be understood by those skilled in the art.

I claim:
1. An electric time piece comprising time-piece works having a drive input element; a resonator comprising a flexible laminated magnetostrictive element having at least one lamina of magnetostrictive material and having the characteristic of flexing when subjected to a magnetic field, said element comprising an elongated flexible strip in the form of a double U with two pairs of leg portions connected by curved portions and a further curved portion connecting inner leg portion to the two pairs, and in which means support said strip by a further third curved portion, a driving winding associated with said magnetostrictive element and producing, when energised, a magnetic field acting on said magnetostrictive element to flex it, means for transmitting energy of said element to said drive input element to drive a time-piece, a time base providing an electric signal of an accurately predetermined frequency, and means electrically connecting said time-base with said resonator whereby the rate of oscillation of said resonator is actually controlled by said time base.

2. An electric time piece according to claim 1, in which said drive input element comprises a ratchet wheel and said movement transmitting means comprises a pawl carried by one of said leg portions and engaging said ratchet wheel to transmit flexing movement of said strip to rotate said ratchet wheel.

3. A drive system for an electric time piece according to claim 1, transducer means responsive to the flexing of said element, and electric circuit means comprising an amplifier, having input and output circuits, means connecting said transducer means in the input circuit of said amplifier and means connecting said winding in the output circuit of said amplifier whereby said winding energized to flex said spring in synchronism with pulses fed to said amplifier by said transducer.

4. An electric time-piece according to claim 1 in which said magnetostrictive element comprises an elongated flexible strip in the form of a double U supported at approximately nodal points and having two leg portions, with a driving winding surrounding one of said leg portions and with movement transmitting means carried by the other of said leg portions.

5. An electric time-piece according to claim 1, in which said magnetostrictive element comprises an elongated flexible strip in the form of a double U with two leg portions and a connecting curve portion, and with spaced nodal points near the junction of said leg and curved portions, means supporting said strip at said spaced nodal points, in which a driving winding surrounds at least one of the leg portons, and movement transmitting means are carried by the curved portion of said strip between said nodal points.

6. An electric time piece according to claim 1, in which said magnetostrictive element comprises an elongate flexible strip shaped to form a double U with leg portions and a connecting curved portion, means supporting said strip at said curved portion, said driving winding comprising a coil surrounding at least one of said leg portions, and in which means is provided for producing a stationary magnetic field premagnetizing said strip to operate on a portion of its magnetization-deformation curve providing optimum deformation upon energization of said driving winding.

7. An electric time piece according to claim 6, in which said premagnetizing means comprises magnet pole portions formed of material having magnetic permeability which varies with temperature so that the effect of temperature on the flexing of said strip is compensated by the effect of temperature on the permeability of said pole portions.

References Cited by the Examiner

UNITED STATES PATENTS

| | | | |
|---|---|---|---|
| 1,889,153 | 11/1932 | Pierce. | |
| 1,995,270 | 3/1935 | Wallace | 310—8.6 X |
| 2,705,313 | 3/1955 | Bundy | 310—26 X |
| 2,738,467 | 3/1956 | Roberts | 310—26 X |
| 2,772,862 | 12/1956 | Van Suchtelen | 310—26 X |
| 2,977,791 | 4/1961 | Dubsky et al. | 73—141 |
| 2,979,673 | 4/1961 | Shonnard | 318—118 X |
| 3,174,130 | 3/1965 | Woollett | 310—26 X |

MILTON O. HIRSHFIELD, *Primary Examiner.*

ORIS L. RADER, *Examiner.*

C. W. DAWSON, D. F. DUGGAN, *Assistant Examiners.*